3,079,421
POLYCYANOPOLYSULFONYLETHYLENES
Elmore L. Martin, Wilmington, Del., assignor to E. I. du Pont de Nemours and Company, Wilmington, Del., a corporation of Delaware
No Drawing. Filed Oct. 30, 1959, Ser. No. 849,733
6 Claims. (Cl. 260—464)

This invention relates to polysubstituted ethylenes. More particularly, it relates to polycyanopolysulfonylethylenes, and still more specifically to dicyanovinylene disulfones.

Numerous polysubstituted ethylenes have been described in the literature. These compounds vary very widely in properties and have been used for a variety of purposes.

A new and very attractive class of polysubstituted ethylenes has now been discovered which can be described generically as dicyanovinyl disulfones. These new compounds are 1,2-dicyano-1,2-disulfonylethylenes of the general formula

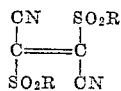

wherein R is organic and which embraces all geometric (i.e., cis and trans) isomers. These new 1,2-dicyano-1,2-disulfonylethylenes can be prepared in high yield by a direct process from the reaction of a salt of organic sulfinic acids with a perhalogenated 1,2-dicyanoethylene or -ethane, wherein the halogen is chlorine, bromine or fluorine, i.e., dichlorofumaronitrile, dichloromaleonitrile, tetrachlorosuccinonitrile and the corresponding bromo- and fluoro-compounds.

This process is illustrated by the following equation in which R is defined as above and M is a metal,

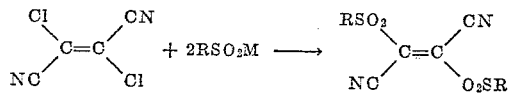

Preferably, R is a hydrocarbyl group. By the term "hydrocarbyl" is meant any monovalent organic group composed solely of carbon and hydrogen. Typical hydrocarbyl groups are alkyl, alkenyl, cycloalkyl, aryl, aralkyl, and alkaryl.

One convenient method for preparing the products of this invention consists in bringing a salt of a hydrocarbylsulfinic acid into intimate contact with a 1,2-dichloro-1,2-dicyanoethylene in a liquid reaction medium which is non-reactive to reactants and products at a suitable temperature which is generally in the range of −70 to +40° C. and maintaining the mixture at said temperature until the reaction is essentially complete as indicated by cessation of an exothermic reaction and the disappearance of one or both of the original reactants. The reaction mixture is then diluted with water or some other liquid which causes the product to precipitate. The product is then separated by filtration, washed with water or an alcohol, and further purified, if desired, by crystallization.

The metal sulfinates as a class are operable in the present invention but the alkali and alkaline earth metal salts are preferred. Sulfinic acids can be conveniently prepared by methods similar to those described in Beilstein, "Handbuch der Organischen Chemie," vol. IV, pp. 1–3, vol. XI, pp. 1–22; Allen, "J. Org. Chem." 7, 23 (1942) and Houlton and Tartar, "J. Am. Chem. Soc.," 60, 544 (1938), and they can be converted to any desired salt by well-known methods. Illustrative of the sulfinic acid salts which are operable in this invention are those with lithium, sodium, potassium, magnesium, calcium and barium ions. Mixtures of two or more of the above-named salts can also be used. Illustrative examples of sulfinic acids which are operative as their salts in this invention are:

Benzenesulfinic acid
o-, m-, and p-Toluenesulfinic acids
α- and β-Naphthylenesulfinic acid
Methanesulfinic acid
Ethanesulfinic acid
1-butanesulfinic acid
Benzylsulfinic acid
Allylsulfinic acid
Cyclohexylsulfinic acid
p-Chlorophenylsulfinic acid
Dodecanesulfinic acid
Heptylsulfinic acid
Octadecylsulfinic acid
o-, m-, and p-Cyanobenzenesulfinic acid
Isopentanesulfinic acid
Ethanedisulfinic acid
β-Hydroxyethanesulfinic acid
β-(β-Hydroxyethylsulfonyl)ethanesulfinic acid
2-methoxybenzenesulfinic acid
4-methoxybenzenesulfinic acid
2-carboxybenzenesulfinic acid
2-carbomethoxybenzenesulfinic acid
5-chloro-2-cyano-3-methylbenzenesulfinic acid
2-cyano-5-methylbenzenesulfinic acid
4-cyano-3-methylbenzenesulfinic acid
2-cyano-3,5-dimethylbenzenesulfinic acid
1-cyano-2-naphthalenesulfinic acid
1-cyano-8-naphthalenesulfinic acid
Benzene-1,3-disulfinic acid
Carbethoxymethanesulfinic acid
2-carbethoxyethanesulfinic acid
4-cyanobutanesulfinic acid
5-carbomethoxypentanesulfinic acid
4-acetylaminobenzenesulfinic acid
4-phenylsulfonylbenzenesulfinic acid
2-phenoxyethanesulfinic acid
3-methoxypropanesulfinic acid
4-phenoxybenzenesulfinic acid
2-, 3-, and 4-nitrobenzenesulfinic acid
4-phenylthiobenzenesulfinic acid Liquids suitable for the reaction medium in the practice of this invention are preferably the lower dialkyl, lower alkanoamides such as dimethylformamide, diethylformamide, tetramethylurea, N,N-dimethylacetamide, but other liquids such as dioxane, tetrahydrofuran, ethanol, acetonitrile, diethyl ether, ethylene glycol dimethyl ether, dimethyl sulfoxide, ethyl acetate, benzene and water can be used. It is not required that the organosulfinate salt be soluble in the liquid reaction medium, but in such cases the salt should be very finely divided so that it can be brought into intimate contact with the halocyano reactant.

Temperature is not a critical factor in the practice of this invention although the preferred range is from about −40° C. to about +40° C. but other temperatures as low as −70° C. and as high as 100° C. or even higher can be used.

For convenience, the reactions of this invention are conducted at normal atmospheric pressure but pressures above and below atmospheric can be used. The reactor can be a vessel of simple design constructed of any non-corrosive material such as glass, ceramic-ware, or stainless steel and preferably provided with means for agitation, cooling and heating, and equipped to protect the charge from atmospheric contaminants.

The molecular ratio of metal sulfinate to the chloro-, bromo-, or fluoro-1,2-dicyanoethane derivative used in this process may be varied widely. However, best results are obtained when the ratio is in the range of 1:1 to 4:1 and this constitutes the preferred range but ratios ranging up to 10:1 or even higher can be used.

The formation of the 1,2-dicyano-1,2-disulfonyl-ethylenes of this invention is illustrated more fully in the following examples in which parts are given by weight unless otherwise specified.

EXAMPLE I

To a solution of 294 parts of dichlorofumaronitrile in 2300 parts of dimethylformamide is added in small portions 356 parts of finely powdered, anhydrous sodium p-toluenesulfinate. The temperature is maintained at 10–20° C. by means of external cooling during the addition of the sulfinate, and for an additional period of 5 minutes. The reaction mixture is diluted with a large volume of cold water and the reaction mixture is filtered. The filter cake is washed with water and a small volume of methanol. Crystallization from methylene chloride gives 180 parts of 1,2-dicyano-1,2-bis-(p-toluenesulfonyl)ethylene (47% of theory, based on sodium p-toluene sulfinate) in the form of faintly yellow needles melting at 245–247° C. with decomposition. The formula of this compound is

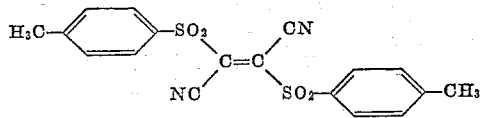

*Analysis.*—Calc'd for $C_{18}H_{14}O_4N_2S_2$: C, 55.94; H, 3.65; N, 7.26; S, 16.58. Found: C, 56.21; H, 3.67; N, 6.78; S, 16.66.

EXAMPLE II

Example I is repeated except to a solution of 15 parts of dichloromaleonitrile in 47 parts of dimethylformamide is added 40 parts of anhydrous, finely powdered sodium p-toluenesulfinate in small portions with stirring and the temperature is maintained at −10 to 0° C. The yield of essentially pure 1,2-dicyano-1,2-bis(p-toluenesulfonyl)-ethylene is 28 parts (72% of theory, based on dichloromaleonitrile) and it melts at 245–247° C. with decomposition. Crystallization from acetonitrile gives faintly yellow crystals melting at 245–247° C. with decomposition.

EXAMPLE III

A solution of 218 parts of tetrachlorosuccinonitrile in 1430 parts of dimethylformamide is cooled to 5° C. and 540 parts of anhydrous sodium p-toluenesulfinate is added in small portions with stirring. After stirring at 5–10° C. for 5 minutes, the reaction mixture is warmed to 20° C. and diluted with ice and water. The nearly colorless precipitate is collected, washed with cold water and air-dried. Crystallization from methylene chloride gives 180 parts of 1,2-dicyano-1,2-bis(p-toluenesulfonyl)ethylene (62% of theory, based on sodium p-toluenesulfinate) in the form of faintly yellow needles melting at 245–247° C. with decomposition, alone or in admixture with a sample of the product of Example I.

EXAMPLE IV

A solution of 30 parts of dichlorofumaronitrile in 47 parts of dimethylformamide is cooled to −40° C. and 50 parts of anhydrous potassium methanesulfinate is added in one portion with stirring, the temperature being maintained at −20° C. to −30° C. by external cooling. After stirring at −30° C. to −40° C. for 5 minutes, the reaction mixture is diluted with cold water and filtered. The filter cake is washed first with water, then with a small volume of methanol and finally with ether. The yield of essentially pure 1,2-dicyano-1,2-bis(methanesulfonyl)-ethylene is 20 parts (40% of theory). Crystallization from acetonitrile gives 14 parts of colorless crystals which melt at 220–222° C. with decomposition, alone or in admixture with the product prepared from dichlorofumaronitrile and sodium methanesulfinate as described in Example VI.

EXAMPLE V

To 95 parts of dimethylformamide cooled to −40° C. is added 100 parts of magnesium cyclohexylsulfinate followed by the addition in small portions with stirring of a solution of 45 parts of dichlorofumaronitrile in 45 parts of tetrahydrofuran, the temperature being maintained at −40 to −30° C. by means of external cooling. One hundred (100) parts of anhydrous magnesium sulfate is then added and the reaction mixture is allowed to warm to 20° C. whereupon an exothermic reaction takes place and the temperature is maintained at 25–35° C. by cooling. After stirring for 3 minutes at 25–35° C., the reaction mixture is diluted with ice and water and the precipitate is collected by filtration and is washed with cold water. The moist filter cake is dissolved in methylene chloride and the solution is washed in turn with dilute hydrochloric acid, dilute sodium bicarbonate solution and water. After drying with anhydrous magnesium sulfate, the solution is concentrated to a small volume during which time colorless crystals separate. Anhydrous ether is added and the concentration is continued to a small volume. The yield of colorless crystals of 1,2-dicyano-1,2-bis(cyclohexylsulfonyl)ethylene melting at 215–216° C. with decomposition is 32 parts. Recrystallization from methylene chloride-ether as above gives colorless crystals melting at 216–217° C. with decomposition.

*Analysis.*—Calc'd for $C_{16}H_{22}O_4N_2S_2$: C, 51.84; H, 5.99; N, 7.57; S, 17.31. Found: C, 52.11; H, 6.16; N, 7.52; S, 17.31.

The addition of N,N-dimethylaniline to a solution of the 1,2-dicyano-1,2-bis(cyclohexylsulfonyl)-ethylene in dimethylformamide results in the formation of a magenta dye whereas a blue dye is obtained on addition of 1,1-bis(p-dimethylaminophenyl)ethylene to a dimethylformamide solution of the disulfonyldicyanoethylene.

Following the general procedure of Example I, dichlorofumaronitrile was reacted with the $RSO_2Na$ compounds indicated in Table I with the formation of the 1,2-dicyano-1,2-disulfonylethylenes indicated therein.

Table 1
PREPARATION OF 1,2-DICYANO-1,2-DISULFONYL ETHYLENES FROM DICHLOROFUMARONITRILE AND RSO₂Na

| Example | Reaction Temp. (°C.) | R— | RSO₂C(CN)=C(CN)O₂SR M.P. (°C.) | Anal. Calc'd/Found C | H | N | S |
|---|---|---|---|---|---|---|---|
| VI | −40 to −20 | CH₃— | 220–222 ᵈ (decomp.) | 30.74 / 31.03 | 2.58 / 2.73 | 11.96 / 11.64 | 27.39 / 27.29 |
| VII | −50 to −30 | C₂H₅— | 196–198 ᵉ (decomp.) | 36.61 / 36.88 | 3.84 / 3.91 | 10.68 / 10.73 | 24.47 / 24.63 |
| VIII | −30 to −15 | n—C₄H₉— | 118–119 ᶠ | 45.24 / 45.38 | 5.70 / 5.73 | 8.80 / 8.86 | 20.15 / 19.90 |
| IX | −40 to −20 | ⬡— | 264–265 ᵈ (decomp.) | 53.60 / 53.81 | 2.81 / 2.80 | 7.82 / 8.01 | 17.91 / 18.06 |
| X ᵃ | 30 to 40 | CH₃—⬡— | 245–247 ᵉ (decomp.) | (See Example I) | | | |
| X ᵇ | 0 to 30 | CH₃—⬡— | 245–247 ᵉ (decomp.) | | | | |
| XII ᶜ | 30 to 40 | CH₃—⬡— | 245–247 ᵉ (decomp.) | | | | |
| XIII | −70 to −60 | ⬡—CH₂— ᵍ | 183–185 ᵉ (decomp.) | 55.94 / 56.09 | 3.65 / 3.74 | 7.26 / 7.42 | 16.53 / 16.70 |
| XIV | −70 to −60 | CH₂=CH—CH₂— | 136–138 ᶠ (decomp.) | 41.93 / 42.02 | 3.52 / 3.53 | 9.79 / 9.84 | 22.41 / 22.57 |
| XV | −70 to −60 | Cl—⬡— | 258–259 ᶠ (decomp.) | 44.95 / 45.10 | 1.89 / 2.02 | 6.56 / 6.61 | 15.02 / 15.12 |
| XVI | −60 to −10 | ⬡— (with CN) | (Isolated in the form of a blue dye (M.P. 222–224° C.) on treatment with dimethylaniline) | | | | |
| XVIA | 10 to 20 | H₃CO—⬡— | 245–247 ᶠ (decomp.) | 51.64 / 51.81 | 3.37 / 3.23 | 6.70 / 6.31 | -------- |
| XVII ʰ | −20 to −10 | CH₃CONH—⬡— | >280 (decomp.) | 51.70 / 51.66 | 3.87 / 4.04 | 14.43 / 14.57 | 12.02 / 11.94 |
| XVIII | −60 to −30 | NO₂—⬡— | (Isolated in the form of a green dye (M.P. 209–210° C.) on treatment with dimethylaniline) | | | | |

ᵃ Reaction carried out in acetonitrile.
ᵇ Reaction carried out in dioxane-water.
ᶜ Reaction carried out in 1,2-dimethoxyethane.
ᵈ Crystallized from acetonitrile.
ᵉ Crystallized from CH₂Cl₂.
ᶠ Crystallized from CH₂Cl₂-ether.
ᵍ This product is worked up according to the procedure of Example V. When the procedure of Example I is followed, 1,2-dicyano-1-benzyl-2-benzylsulfonylethylene, a colorless compound, M.P. 127–128° C., is obtained. Anal. Calc'd for C₁₆H₁₄O₂N₂S: C, 67.04; H, 4.37; N, 8.70; S, 9.95. Found: C, 66.96; H, 4.48; N, 8.80; S, 9.97. This product does not form a dye with dimethylaniline.
ʰ Product contains 1.5 mols acetonitrile as solvent of crystallization.

The 1,2-dicyano-1,2-disulfonylethylenes are useful as dye intermediates. On reaction with secondary or tertiary aromatic amines, these substituted ethylenes yield dyes of various shades depending upon the nature of the sulfonyl substituent and the nature of the aromatic amine. The resultant dyes and dicyanosulfonylvinyl compounds which are formed by the following reaction:

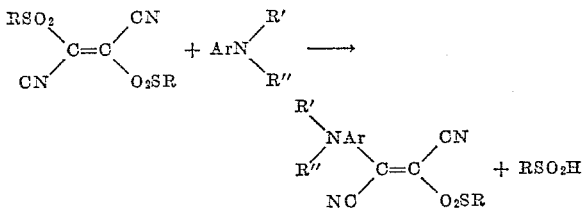

In the above formulas, R is an organic group, as previously defined, R' is hydrogen or alkyl, R" is alkyl or substituted alkyl, and Ar is an aryl group in which the 4-position, relative to the amino group, is unsubstituted.

The preparation of a typical dye from a 1,2-dicyano-1,2-disulfonylethylene is illustrated by the following example.

EXAMPLE A

To a solution of 20 parts of 1,2-dicyano-1,2-bis(ethanesulfonyl)ethylene in 475 parts of dimethylformamide is added 50 parts of N,N-dimethylaniline. An immediate exothermic reaction takes place and the temperature increases to 40° C. After the temperature subsides (5 to 10 minutes) the reaction mixture is diluted with ice and water and the precipitated dye is collected. Crystallization from methylene chloride-ether gives 15 parts of 4-[1,2-dicyano-2-(ethanesulfonyl)vinyl]-N,N-dimethylaniline having the formula

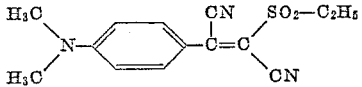

melting at 185–186° C. This dye is obtained as finely divided platelets which are nearly black in color. The molecular extinction coefficient in methylene chloride is 36,500 at 513 mμ. The compound dyes cellulose acetate, nylon, silk, "Dacron" (a polyethyleneterephthalate polyester fiber) and "Orlon" (a polyacrylonitrile fiber) fabrics shades of red whereas wool fabrics are dyed reddish-orange.

*Analysis.*—Calc'd for $C_{14}H_{15}O_2N_3S$: C, 58.09; H, 5.23; S, 11.09. Found: C, 58.37; H, 5.40; S, 11.12.

A red dye is prepared by the procedure of Example A from the 1,2-dicyano-1,2-bis(4-acetamidobenenesulfonyl)-ethylene of Example XVII and N,N-dimethylaniline. The dye, which is 4-(1,2-dicyano-2-(4-acetamidobenzenesulfonyl)vinyl)-N,N-dimethylaniline, melts at 204–206° C. and the molecular extinction coefficient in methylene chloride at 520 mμ is 38,600.

*Analysis.*—Calc'd for $C_{20}H_{18}O_3N_4S$: C, 60.88; H, 4.60; N, 14.22. Found: C, 60.98; H, 4.54; N, 14.21.

The cold reaction mixture of Example XVI containing 1,2-dicyano-1,2-bis(2-cyanobenzenesulfonyl)ethylene is treated with N,N-dimethylaniline and the mixture is warmed to 25° C. and held there for 10 minutes. The product is isolated by the procedure of Example A to give deep blue crystals of 4-(1,2-dicyano-2-(2-cyanobenzenesulfonyl)vinyl)-N,N-dimethylaniline, M.P. 222–224° C. The molecular extinction coefficient is 42,000 in methylene chloride at 532 mμ.

*Analysis.*—Calc'd for $C_{19}H_{14}O_2N_4S$: C, 62.94; H, 3.89; N, 15.47. Found: C, 62.45; H, 4.01; N, 15.42.

The cold reaction mixture of Example XVIII containing 1,2-dicyano-1,2-bis(4-nitrobenzenesulfonyl)ethylene is treated with N,N-dimethylaniline and allowed to warm up to 30°. The product, isolated by the procedure of Example A, is a deep green dye, which is 4-(1,2-dicyano-2-(4-nitrobenzenesulfonyl)vinyl)-N,N-dimethylaniline, melts at 209–210° and the molecular extinction coefficient in methylene chloride at 537 mμ is 45,000.

*Analysis.*—Calc'd for $C_{18}H_{14}O_4N_4 \cdot \frac{1}{2}CH_2Cl_2$: C, 52.27; H, 3.56; N, 13.20. Found: C, 52.29; H, 3.58; N, 12.53.

These dicyanosulfonylvinyl dyes can also be obtained by an alternative procedure comprising the reaction of a metal organosulfinate with 1,2-dihalo-1,2-dicyanoethylene in the presence of secondary or tertiary aromatic amines, as indicated by the following equation, wherein the R, R', R'' and Ar groups are defined as above.

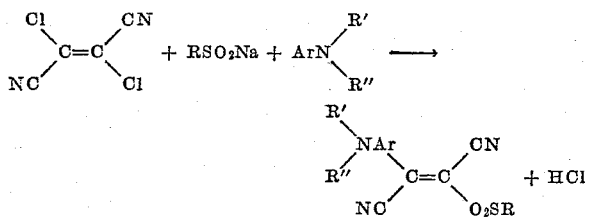

The preparation of a typical dye by this procedure is illustrated by the following example.

EXAMPLE B

A solution of 59 parts of dichlorofumaronitrile in 135 parts of dimethylformamide is cooled to —20° C. and 72 parts of finely powdered anhydrous sodium p-toluenesulfinate and 86 parts of N-methylaniline are added simultaneously and at approximately equivalent rates with stirring. The temperature is maintained at —10 to —20° C. during the addition and then allowed to increase to 25° C. After stirring for 30 minutes at 25° C., the reaction mixture is diluted with a large volume of cold water. Two crystallizations from methylene chloride-ether gives 100 parts (74% of theory) of bright red crystals of 4-[1,2-dicyano-2-(p-toluenesulfonyl)vinyl]-N-methylaniline, melting at 156–157° C. The molecular extinction coefficient in methylene chloride is 11,000 at 490 mμ. The compound dyes cellulose acetate, nylon, silk, "Dacron" (a polyethyleneterephthalate polyester fiber) and "Orlon" (a polyacrylonitrile fiber) fabrics shades of red, whereas wool fabrics are dyed yellow.

*Analysis.*—Calc'd. for $C_{18}H_{15}O_2N_3S$: C, 64.06; H, 4.48; S, 9.51. Found: C, 64.08; H, 4.63; S, 9.31.

Among the aromatic amines which can give dicyanosulfonylvinyl dyes by reaction with 1,2-dicyano-1,2-disulfonylethylene or with a metal hydrocarbylsulfinate and a 1,2-dihalo-1,2-dicyanoethylene are secondary and tertiary aromatic amines in which hydrogen is bonded to the annular carbon in the 4-position such as N-methylaniline, N,N-dimethylaniline, N-methyl-N-(β-cyanoethyl)aniline, N,N-diethylaniline, diphenylamine, N,N-dimethyl-o-toluidine, N,N-diethyl-m-toluidine and N,N-di-n-butylaniline.

Other dyes can be made by the reaction of 1,2-dicyano-1,2-disulfonylethylenes (or alternatively, 1,2-dihalo-1,2-dicyanoethylene and metal organosulfinates) with primary aromatic amines, certain ketones, 1,1-bis-(p-dialkylaminophenyl)ethylene, and in general with QH compounds, where Q is a monovalent organic radical such that the corresponding QH compound will react with benzene diazonium chloride to yield an azo dye.

The 1,2-dicyano-1,2-disulfonylethylenes of this invention will undergo still other types of reactions including the Diels-Alder reaction with 1,3-dienes, and the co-cyclodimerization with selected vinyl compounds.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Compounds represented by the formula $$RSO_2C(CN)=C(CN)O_2SR$$

wherein R is a monovalent organic radical of not more than 18 carbon atoms and is selected from the group consisting of
 alkyl,
 alkenyl,
 cycloalkyl,
 hydroxyalkyl,
 cyanoalkyl,
 aryloxyalkyl,
 alkoxyalkyl,
 arylthioaryl,
 aralkyl, and
 aryl wherein the annular carbon atoms of said aryl radicals are bonded to members of the group consisting of hydrogen, alkyl, halogen, cyano, alkoxy, carboxy, carboalkoxy and nitro.

2. 1,2-dicyano-1,2-bis(p-toluenesulfonyl)ethylene.
3. 1,2-dicyano-1,2-bis(methanesulfonyl)ethylene.
4. 1,2-dicyano-1,2-bis(cyclohexylsulfonyl)ethylene.
5. Process which comprises reacting at a temperature of from —70° to 40° C. in a liquid medium a salt of the formula $$RSO_2M$$

wherein R is a monovalent organic group of up to and including 18 carbon atoms and is selected from the group consisting of
 alkyl,
 alkenyl,
 cycloalkyl,
 hydroxyalkyl,
 cyanoalkyl,
 aryloxyalkyl,
 alkoxyalkyl,
 arylthioaryl,
 aralkyl, and aryl wherein the annular carbon atoms of said aryl radicals are bonded to members of the group consisting of hydrogen, alkyl, halogen, cyano, alkoxy, carboxy, carboalkoxy, and nitro, and M is a cation selected from the class consisting of alkali metals and alkaline earth metals, with a perhalogenated 1,2-dicyanoethylene of the formula

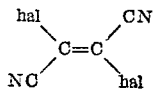

wherein hal represents a halogen selected from the class consisting of chlorine, bromine and fluorine, to produce a 1,2-dicyano-1,2-disulfonylethylene of the formula

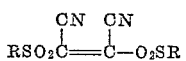

wherein R has the same significance as above.

6. The process as set forth in claim 5 wherein the medium is a lower dialkyl, lower alkanoamide.

References Cited in the file of this patent

Bergmann: "The Chemistry of Acetylene and Related Compounds," 1948, page 80.

Bohr et al.: Ber., 90, pages 438–443 (1959).